United States Patent
Stirewalt

(10) Patent No.: US 9,686,964 B1
(45) Date of Patent: Jun. 27, 2017

(54) HAY BALE SHREDDER FOR FEEDING LIVESTOCK

(71) Applicant: Daniel Stirewalt, Prineville, OR (US)

(72) Inventor: Daniel Stirewalt, Prineville, OR (US)

( * ) Notice: Subject to any disclaimer, the term of this patent is extended or adjusted under 35 U.S.C. 154(b) by 0 days.

(21) Appl. No.: 15/084,124

(22) Filed: Mar. 29, 2016

(51) Int. Cl.
*A01F 29/00* (2006.01)
*A01D 90/00* (2006.01)
*A01K 5/00* (2006.01)
*B26D 1/08* (2006.01)
*B26D 7/06* (2006.01)
*B26D 5/20* (2006.01)

(52) U.S. Cl.
CPC ............ *A01K 5/005* (2013.01); *A01F 29/005* (2013.01); *B26D 1/08* (2013.01); *B26D 5/20* (2013.01); *B26D 7/0608* (2013.01); *Y10S 241/605* (2013.01)

(58) Field of Classification Search
CPC .... A01F 29/005; A01F 29/02; Y10S 241/605; A01D 90/10; A01D 90/105; A01D 87/126; A01D 90/08; A01K 5/001; B62D 5/20
USPC .......... 241/605, 280; 414/518, 25, 401, 509, 414/111; 119/57.91
See application file for complete search history.

(56) References Cited

U.S. PATENT DOCUMENTS

| | | | | | |
|---|---|---|---|---|---|
| 4,170,426 | A | * | 10/1979 | White | A01F 29/005 414/111 |
| 5,813,616 | A | * | 9/1998 | Vandervalk | A01F 29/005 241/101.76 |
| 5,895,001 | A | * | 4/1999 | Kuelker | A01F 29/005 241/101.76 |
| 5,997,233 | A | * | 12/1999 | Whatley | A01D 90/10 414/25 |
| 6,328,520 | B1 | * | 12/2001 | Maclay | A01D 87/126 414/111 |
| 6,685,120 | B2 | * | 2/2004 | Grellner | A01F 29/005 241/282.1 |
| 7,721,984 | B2 | * | 5/2010 | Bootsma | A01D 90/10 241/101.76 |

* cited by examiner

Primary Examiner — Yvonne Abbott-Lewis
(74) Attorney, Agent, or Firm — Donn K. Harms

(57) ABSTRACT

A hay bale flaking device mountable on a wheeled vehicle such as a trailer is provided. The flaking device employs a ram to translate a hay bale on a ramp, and underneath a cutting blade which at timed intervals cuts flakes of hay from the distal end of the hay bale. The timing and thickness of the flakes may be adjustably controlled. A secondary bale of hay may be carried by the device for positioning upon the ramp subsequent to use of a previous bale to make flakes.

10 Claims, 4 Drawing Sheets

HAY BALE SHREDDER FOR FEEDING LIVESTOCK

BACKGROUND OF THE INVENTION

1. Field of the Invention

The present invention relates generally to hay for feeding livestock. More particularly, it relates to a vehicle-mounted device configured to render square bales of hay into sequentially positioned small piles of hay on a pasture surface along the route traveled by the vehicle.

2. Prior Art

On modern farms and ranches, hay or grass is the foundation of the diet for all grazing animals such as cattle and horses. Hay can provide as much as 100% of the fodder required for such grazing animals. In many cases, hay is provided as feed to an animal instead of allowing that animal to graze on grasses in a pasture. Such occurs particularly in the winter or during times when drought or other conditions make pasture grazing by the animal unavailable.

Animals that can eat hay vary in the types of grasses which are suitable for their consumption, the ways they consume hay, and how they digest it. Therefore, different breeds or types of animals or livestock require hay that is derived of plants which are similar plants to what they would eat while grazing.

Many animals are fed hay in two daily feedings, such as morning and evening. This schedule can vary and is generally more for the convenience of humans caring for the animals. Left to their own grazing, most grazing animals will naturally consume fodder in multiple feedings throughout a day. Some animals, especially those being raised for meat, may be given enough hay that they have enough to eat the entire day. Other animals, especially those which are ridden or driven as working animals, may only have time to eat when not working and may be given a more limited amount of hay to prevent them from getting too fat.

The proper amount of hay and the type of hay required varies somewhat between different species. In many cases, hay or pasture forage must make up 50% or more of the diet of the animal by weight. Consequently, persons feeding the animals must be able to provide sufficient amounts of hay, in sufficient daily feedings, at the proper locations for the animals to consume it timely. Such a task also must accommodate the use of hay bales which have been formed to industry standard sizes and weights.

To that end, in modern agriculture hay for feed is harvested and then formed to large square bales. An increase in such bale sizes has become progressively more attractive as the power of vehicles employed on farms has increased to more easily handle the weight and bulk of larger bales in feeding livestock.

However, as noted above, these hay bales must be broken up and positioned in pastures and fields where the livestock reside. In most cases, also as noted, this task must be accomplished multiple times a day.

While large agricultural corporations can afford the capital investment for specialized equipment adapted to transport and cut hay bales into smaller increments which are deposited on pastures, small farmers and ranchers generally cannot afford such an investment in single-use machinery. As a consequence, different tactics have been employed by smaller farmers and ranchers to reduce the large heavy hay bales to strategically positioned smaller portions of the bale for their livestock to eat. One popular but time and labor intensive mode of such bale distribution requires the positioning of one or more bales onto a pickup or flat bed truck, and using pitchforks or other tools to cut the large bale into small pieces which are pushed from the moving vehicle to multiple locations in the pasture. This of course requires one person to cut the bale into sections and a second person to drive the vehicle.

While such a method allows for the purchase and transport and use of more economical larger bales of hay, it is labor and time intensive for at least two individuals at the same time. On small farms and ranches where days are long and time is perpetually short to accomplish all the required tasks, such a time and labor intensive manner for distributing hay to the animals, while required by the inability to purchase single-use expensive equipment, is at best ineffective.

As such, there exists an unmet need, for a vehicle-engageable device, which performs the task of flaking or cutting large heavy hay bales to small portions. Such a device should be operable by a single individual. Such a device should be engageable to a pickup truck or flat bed or other vehicle capable of traversing a pasture but removable to thereby allow for other uses of the powered vehicle. Such a device should allow for the user to choose a portioning size of each flake or cutting from the hay bale. Further such a device should be configured to sequentially deposit these individual portions of hay, along a route driven through the pasture. Still further, such a device should ideally be able to carry a plurality of hay bales to eliminate wasted trips back to the bale supply for refilling.

The forgoing examples of related art and limitations related therewith are intended to be illustrative and not exclusive, and they do not imply any limitations on the disclosed hay bale shredding invention and method described and claimed herein. Various limitations of the related art are already or will become apparent to those skilled in the art upon a reading and understanding of the specification below and the accompanying drawings.

SUMMARY OF THE INVENTION

The device and method herein disclosed and described provides a solution to the shortcomings in prior art of sectioning large hay bales into small portions or flakes. The device herein described and disclosed can be mounted upon a vehicle such as a trailer or flatbed, and subsequently dismounted to allow multiple uses for the vehicle itself. Or, in the case of a trailer, the device may be permanently mounted to a vehicle-engageable trailer due to the lower cost of a non-powered vehicle and easy towing thereof.

The device and method herein provide for the cutting and sequential positioning of small sections or flakes of hay, sectioned from the large bale of hay. In all modes this sectioning to flakes is accomplished by the powered translation of the bale along a formed ramp, using a powered ram operatively engaged with the tail end of the bale. The power for sliding the heavy hay bale can be provided by a chain drive and electric motor or a hydraulic motor drive or other means to translate a planar ram contacting the rear of the bale to force it in a direction toward the dispensing end of the ramp.

At the dispensing end is located a means for sequential sectioning of small slices from the leading edge of the translating bale. One preferred mode herein employs a means for sectioning the bale into flakes using a blade driven by hydraulic rams or by other power to drive the blade downward through the bale. The size of the flakes sectioned from the bail and positioning on the pasture surface can be adjusted by an adjustment of the timing at which the blade slices through a section of the hay bale, and the speed at which the hay bale is translated toward the blade.

Also preferred, in all modes of the device, is the provision of an onboard storage support or ramp. This storage support is positioned at the rear of the vehicle or trailer hosting the device, and supports for transport, a spare hay bale for flaking by the blade of the device. When required, the spare bale can easily be flipped onto the ramp by mechanical means for lifting the support to an inclined disposition which will cause the bale to slide onto the ramp. The ability to carry and deposit a spare hay bale for sectioning by the blade, is particularly preferred as it saves the user time which is wasted if the vehicle must return to resupply the hay.

In operation a single person can drive or tow the engaged trailer or vehicle while the device operates to concurrently section the large hay bail into small portions, and to sequentially drop the severed portions along the path of the vehicle through a field or pasture.

With respect to the above description, before explaining at least one preferred embodiment of the herein disclosed hay dispensing system for animal feeding and method thereof in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other hay dispensing structures, methods and systems for carrying out the several purposes of the present disclosed device and method. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of the invention to provide a hay shredding or flaking device which is removably engageable to a powered vehicle transporting it for use.

It is an object of the invention to provide such a hay shredding or flaking device which is operable by a single person during operative employment.

It is yet another object of this invention to provide such a hay shredding device which will easily handle the weight and bulk of a modern large hay bale, as well as carry a second hay bale to minimize trips by the operator for resupply.

These and other objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the hay shredding or flaking system and method herein. It is intended that the embodiments and figures disclosed herein are to be considered illustrative rather than limiting. In the drawings.

Figure 1:
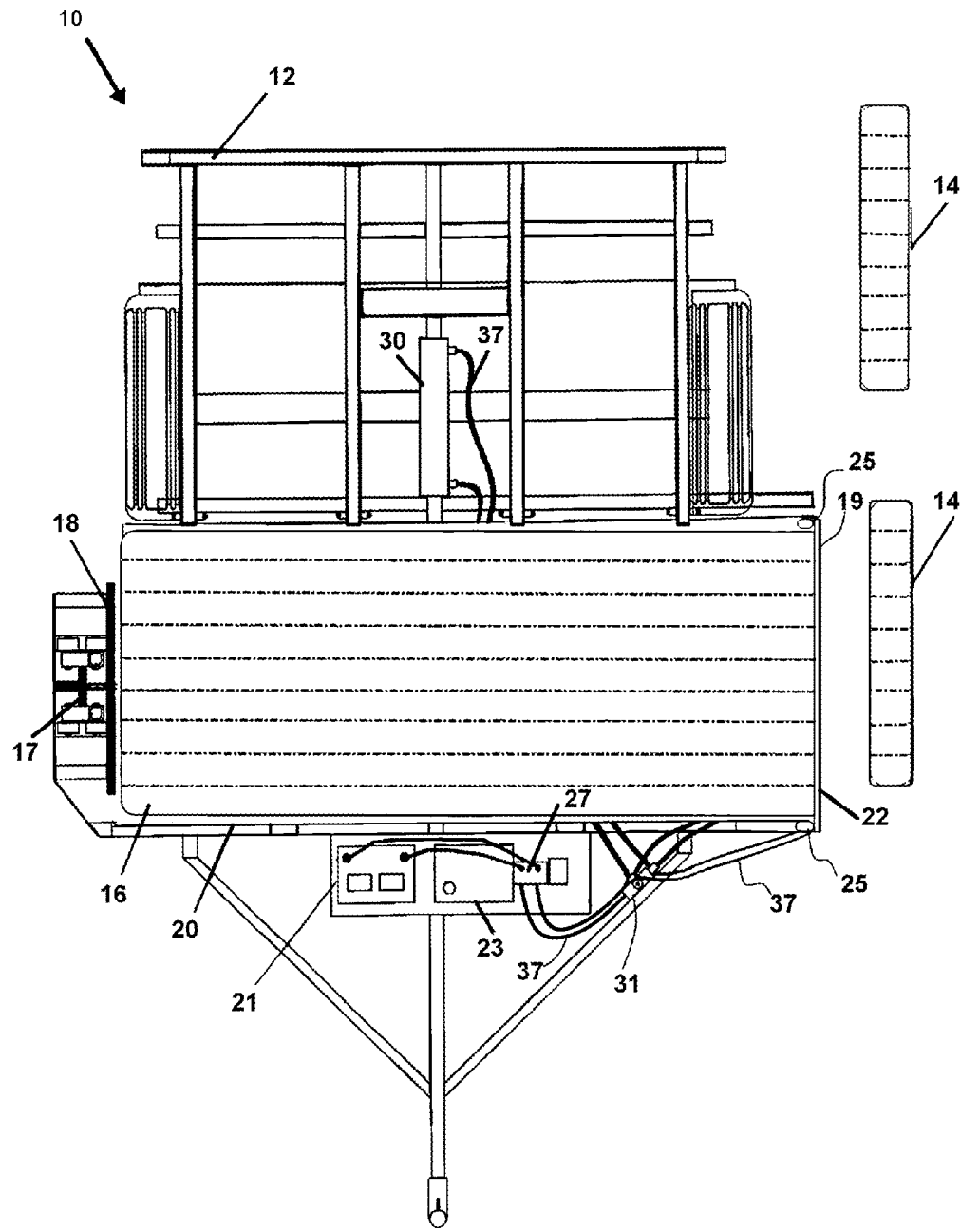
FIG. 1 depicts an overhead plan view of the device mounted upon a trailer or flatbed and showing flakes or sections of the hay bale being sequentially placed by a blade cutting portions from the bale which is translated toward the blade on a powered ramp.

Other aspects of the present hay bale shredder invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-6, wherein similar components are identified by like reference numerals, there is seen in FIG. 1 an overhead plan view of the device 10 mounted upon a wheeled frame herein noted as a vehicle 12 or trailer and showing sections of the hay bale 16 or flakes 14 being sequentially deposited on the ground such as in a pasture.

Placement of flakes 14 or small sections from the large bale 16 is accomplished by translating the bale 16 using a powered ram 18 positioned to contact the rear of the bale 16. A chain drive 17, is powered by a hydraulic or electric drive or other means to power the translation of the ram 18, toward the dispensing end 19 of the ramp 20, such as a hydraulic motor 41 powered by a first pressurized fluid supply from a hydraulic power unit or hydraulic pump 27 which may be powered by an electric motor 23 which is powered by a battery 21. As the ram 18 pushes the bale 16 along the ramp toward the dispensing end 19, a sectioning component for cutting the bale into smaller sections or flakes 14 is employed, to cut sections from the advancing bale 16 which fall to the ground.

The sectioning component herein is preferably adjustable for the thickness of the flakes 14 dispensed and the location on the pasture of flake 14 deposit. This can be done using a controller 31 which selectively may increase or decrease bale 16 speed on the ramp toward the dispensing end 19, to thereby increase or decrease the thickness of the flakes 14. Further, the control of the flake 14 thickness and deposit location can be determined using the controller 31 to slow the timing of the blade 22 so it cuts through the bale 16 at longer sequential intervals.

Alternatively, the controller 31 may control flake 14 thickness, and more or fewer deposit locations, by controlling both the speed of translation of the bale 16 by the ram 18 by controlling the hydraulic motor 41 speed driving the ram 18 and the timing of the blade 22 relative to the translation speed of the bale 16 thereunder. The controller 31 may be linked with a sensor for the speed of the vehicle, such as an accelerometer in the controller 31, or a speedometer on the vehicle, both of which are well known and need not be depicted.

As shown, such as in figured 3-4, as noted above, one particularly preferred means for sectioning the bale 16 into flakes 14 which may be employed is a blade 22. The blade 22 positioned on a mount to hold it elevated above the dispensing end 19 of the ramp 20, and is translated downward by a powered cylinder 25 such as a pneumatic or hydraulic cylinder, which has a translating member engaged to the blade 22 as in FIGS. 3-4. Currently, a hydraulic cylinder 25 powering the blade 22 is favored herein because as noted, as the secondary fluid supply powering it can be timed by a controller 31 in conjunction with movement of the bale 16 by the ram 18, to slice thinner or thicker slices from the bale 16 to form smaller or larger flakes 14.

Using the controller 31, to regulate power to the cylinder 25 driving the blade 22, and to regulate the motor 41 powering the chain drive 17 cease movement of chain drive 17 powering the ram 18 and thus the bale 16 translation, the user can increase or decrease the length of the bale 16 passing passed the blade 22 at the dispensing end 19, to allow the leading end of the bale 16 to be translated less or more passed the blade, before the blade 22 slices off a flake 14. The controller 31 is shown as regulating the flow of fluid through lines 37 to regulate blade 22 cutting timing and bale 16 translation, but as noted if the power providing components for the blade 22 and ram 18 were electric, the controller 31 would regulate the current through the lines 37 to the same outcome.

In a current preferred mode, as the blade 22 is powered to cut through the bale 16, the controller 31 may cut power to the motor 41 powering the chain drive 17 to move the ram 18 momentarily ceasing translation of the bale 16 as part of the operation. This is preferred if the blade 22 translates substantially perpendicular to the bale 16 direction, but if the blade 22 translates at an angle toward the bale 16 may not be necessary as the movement of the bale 16 will slide the blade 22 through the bale 16 at an angle. However, for more uniform sized flakes 14, the controller would be configured to concurrently initiate connected cylinders 25 to move the blade 22 through the bale 16 to cut a flake 14 therefrom and to cease translation of the bale 16 by the ram 18.

As such in a preferred mode of the device 10, the thickness of the flake 14, and the number and distance between sequential deposit locations thereof on the pasture, is provided by the controller 31 timing either or both of both translation speed of the bale 16 and/or the cutting by the blade 22, which may be varied by setting the controller 31 to speed up the ram 18 or slow it down, or speed up cutting by the blade 22 in sequential cuttings, or slow it down. Further as noted, the controller 31 can be provided a signal relative to vehicle speed by one or a combination of speed sensors, from a group including a connected accelerometer, speedometer, or GPS receiver, or the like. In this manner, the user may choose in advance, to set the controller to deposit flakes 14 at a particular distance from each other based on speed of travel of the vehicle, and of a particular thicknesses of each flake based on speed of the ram 18 and the timing of the blade 22 by the controller 31. Such speed sensors, as noted while not depicted, are well known. It is this high degree of control of flake 14 placement distance in sequential deposits, and flake thickness of each deposit, which is particularly valuable to a user with differing livestock and pasture location and topography which will require differing location and amounts of flakes 14.

Figure 2:
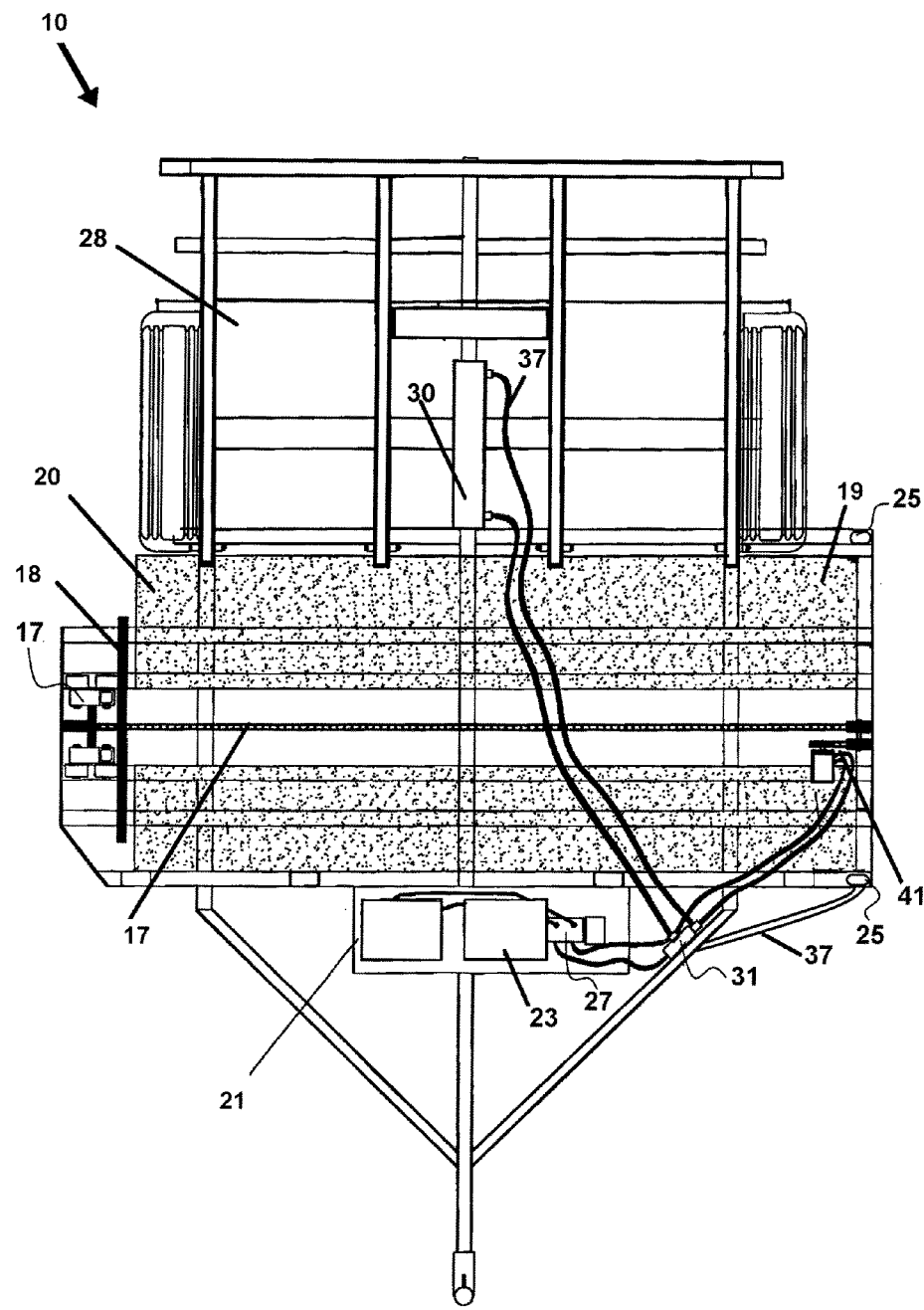
FIG. 2 shows a bottom plan view of the underlying construction of the device for translating hay bales and showing onboard battery power for translating and cutting hay bales.

As noted, FIG. 2 is a bottom view of the underlying construction of the device 10 herein without a bale 16 situated on the ramp 20. The chain drive 17 can be seen engaged with the ram 18 and the motor 41 such that as the motor 41 rotates the chain drive 17 it will force the ram 18 against a bale 16 and translate the bale 16 under the blade 22 for cutting of a distal end of the bale 16 into a flake 14.

Figure 3:
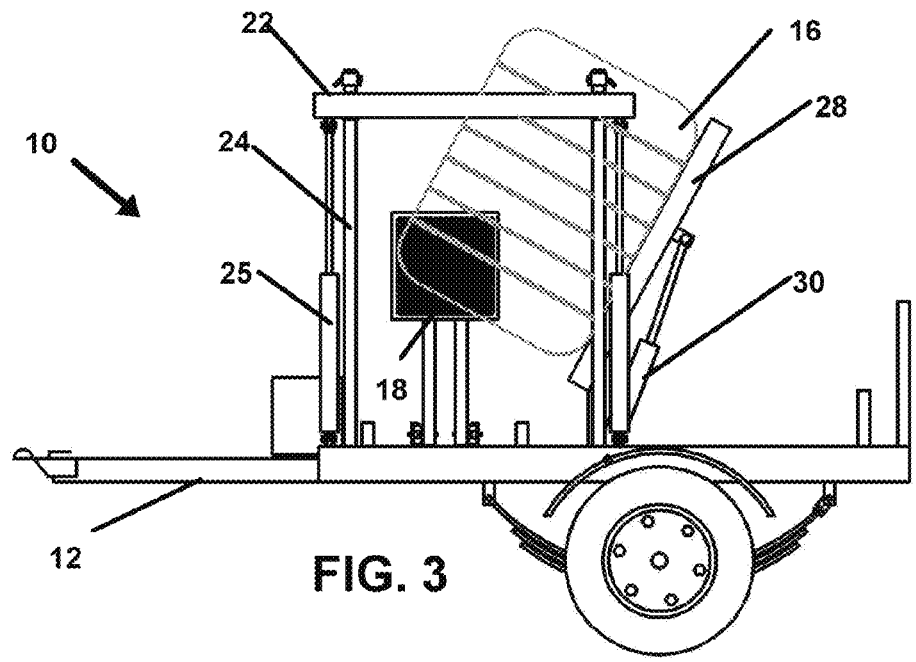
FIG. 3 is a side view of the device of FIG. 1 showing the blade ready to slice portions from replacement bale which is being loaded to the bale track, from a rear storage position for a second bale.

Shown in FIG. 3 is a side view of the device 10 of FIGS. 1 and 2 depicting the gate 24 positioned at the dispensing end 19 of the ramp 20. The gate 24 is positioned underneath the blade 22 which is connected to a powered cylinder 25 using pneumatic or hydraulic or other power, and which provides power communicated to the blade 22 to drive it through a bale 16, as the distal end of the bale 16 is translated past the gate by the ram 18.

Also shown in FIG. 3 is a particularly component in all modes of the device 10 to prevent cessation of work caused by lack of hat to flake. As shown, a secondary bale 16 may be carried on the vehicle on a support 28 which has a storage position, running in a substantially horizontal disposition at the rear of the vehicle 12, to support the secondary bale 16, while a first bale 16 is on the ramp 20. When required, the secondary bale 16 can easily be flipped or rotated to deposit the bale 16 onto the ramp 20, by actuation of a hydraulic cylinder 30 having a third pressurized fluid supply coming from a controller, or other mechanical means for lifting the support 28 from the storage position, to an inclined position, to cause the spare bale 16 to slide upon and operatively load to the ramp 20.

Figure 4:
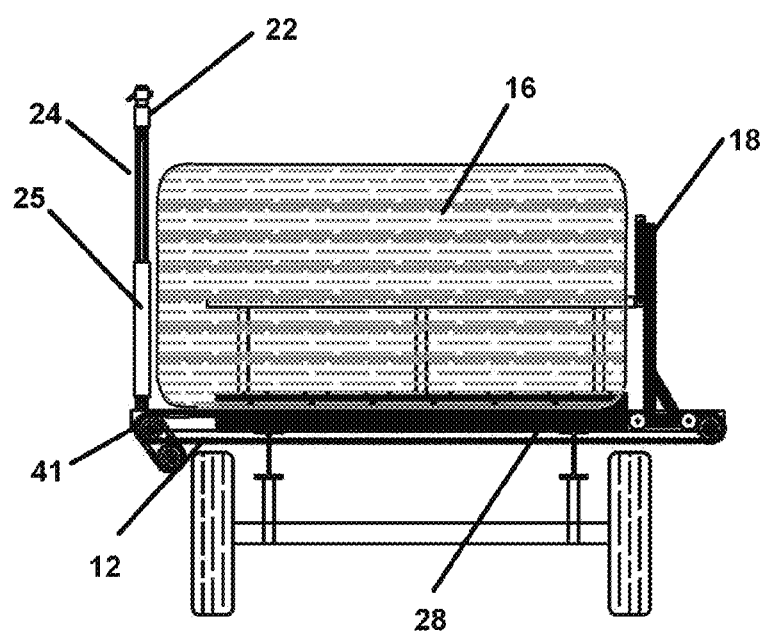
FIG. 4 is a rear view of the device mounted atop a vehicle such as the trailer depicted in FIGS. 1-2 or on a flatbed or other truck.

Depicted in FIG. 4 is a rear view of the device 10 mounted atop a wheeled vehicle 12 such as the trailer. In FIG. 4 is shown the configuration of the device 10 to hold a spare hay bale 16 on the support 28 where it may remain until a first bale 16 on the ramp is fully disbursed as flakes 14 by the blade 22. Thereafter, the secondary bale 16 may be repositioned to the ramp, by using the controller 31 or other means to communicate a third pressurized fluid supply through lines 37 to actuate the cylinder 30 as shown in FIG. 3 where it rotates in an engagement to the vehicle to the elevated position where gravity moves the secondary bale 16 to the ramp.

Figure 5:
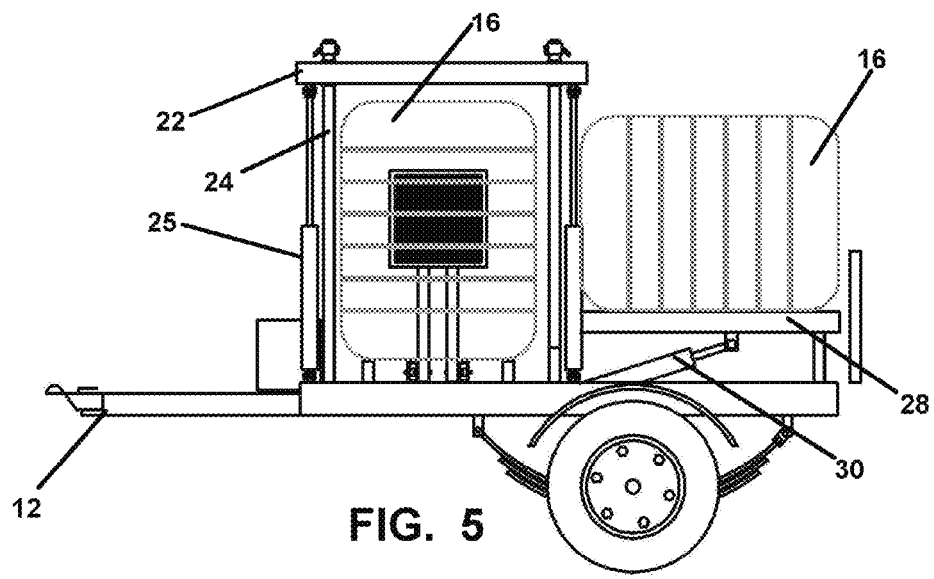
FIG. 5 is a side view of the device herein showing the hay bale on a ramp wherein the ram translates the bale at a determined speed under a cutting blade, to deposit desired thickness of sections of the bale on the ground.

FIG. 5 is a side view of the device 10 showing both the secondary bale 16 in storage and the first bale 16 aligned for cutting by the blade 22 on the ramp, similar to that of FIG. 4. As shown, the blade 22 positioned above the gate 24 through which the bale 16 is translated by the ram 18, may be actuated by the controller 31 to slice the bale 16 into smaller portions or flakes 14 which sequentially fall from the vehicle 12 a distance from each other which may be controlled as noted herein, such as depicted in FIG. 6.

Figure 6:
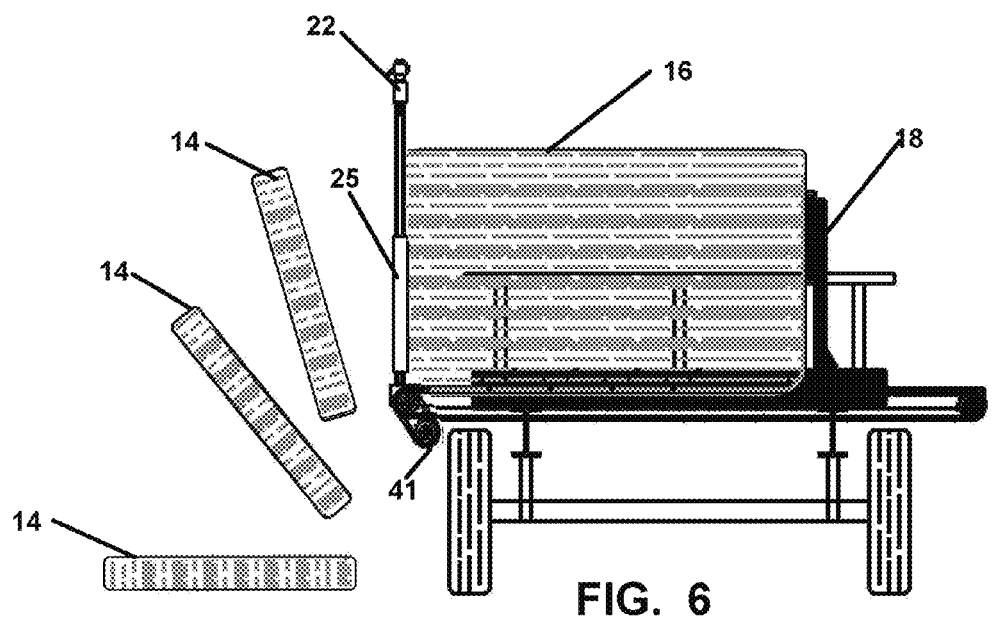
FIG. 6 shows the device from a rear view showing the individual sections cut by the blade from the translating bale which are sequentially deposited on the pasture surface during use.

FIG. 6 shows the device 10 similar to that of FIG. 5 showing flakes 14 or small portions of the bale 16 being sequentially dropped from the vehicle 12, subsequent to the blade 22 driven by a powered cylinder 25, cutting the flakes 14 from the distal end of the bale 16. The ram 18 is shown pushing the opposite end of the bale 16 to translate it through the gate 24 and under the blade 22 for cutting. As noted, the controller 31 momentarily ceases bale 16 translation as the blade 22 cuts through the distal end of the bale 16 to form a flake 14.

It is additionally noted and anticipated that although the hay bale sectioning or shredding device and method herein is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the hay bale shredding and flaking system and method of employment have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A hay bale flaking apparatus, comprising:
   a wheeled vehicle having a ramp extending to a dispensing end positioned on a side edge of said vehicle, said ramp adapted to support a hay bale thereon;
   a ram configured to impart a translation of said hay bale on said ramp, toward said dispensing end;
   a cutting blade positioned at or adjacent said dispensing end of said ramp;
   said cutting blade actuable to translate through said hay bale in individual cuts of said cutting blade, to thereby separate portions from said hay bale into individual flakes, which sequentially fall to a respective ground position from said dispensing end of said ramp;
   a controller, said controller being user configurable to control a speed of said translation of said hay bale on said ramp and a timing of said individual cuts of said cutting blade, and thereby control a thickness of each said flake and a distance between respective ground positions of each said flake;
   a first pressurized fluid supply communicating from said controller to fluid driven motor powering said ram;
   a second pressurized fluid supply communicating from said controller to a hydraulic cylinder powering said cutting blade for said individual cuts in said hay bale;
   said controller varying said first pressurized fluid supply to said fluid driven motor to control said speed of translation on said ramp; and
   said controller varying said secondary pressurized fluid supply to said hydraulic cylinder, to control timing of said individual cuts of said cutting blade.

2. A hay bale flaking apparatus of claim 1, additionally comprising:
   said controller having a speed sensor communicating a signal to said controller indicative of a speed of said wheeled vehicle; and
   said controller configurable to vary said first pressurized fluid supply and said second pressurized fluid supply based on a said signal indicative of said speed of said wheeled vehicle, to actuate said cutting blade to cause said individual flakes to thereby fall sequentially to respective ground positions which are adjustable in distance from each other.

3. A hay bale flaking apparatus of claim 2, additionally comprising:
   a support engaged upon said wheeled vehicle adjacent to said ramp;
   said support having a storage position, configured for supporting a secondary said hay bale thereon;
   said support having an elevated position wherein a said secondary hay bale positioned thereon, moves to operative positioning upon said ramp; and
   whereby said secondary hay bale is positionable upon said ramp by a user by actuating said support to move from said storage position to said elevated position.

4. A hay bale flaking apparatus of claim 3, additionally comprising:
   said support being rotationally engaged at a first side to said wheeled vehicle;
   a support hydraulic cylinder connected to said frame and said support and actuable to move said support to said elevated position; and
   an input to said controller actuating said support to move to said elevated position, by a third pressurized fluid supply communicating from said controller to said support hydraulic cylinder.

5. A hay bale flaking apparatus of claim 1, additionally comprising:
   a support engaged upon said wheeled vehicle adjacent to said ramp;
   said support having a storage position, configured for supporting a secondary said hay bale thereon;
   said support having an elevated position wherein a said secondary hay bale positioned thereon, moves to operative positioning upon said ramp; and
   whereby said secondary hay bale is positionable upon said ramp by a user by actuating said support to move from said storage position to said elevated position.

6. A hay bale flaking apparatus of claim 5, additionally comprising:
   said support being rotationally engaged at a first side to said wheeled vehicle;

a support hydraulic cylinder connected to said frame and said support and actuable to move said support to said elevated position; and an input to said controller actuating said support to move to said elevated position, by a third pressurized fluid supply communicating from said controller to said support hydraulic cylinder.

7. A hay bale flaking apparatus, comprising:

a wheeled vehicle having a ramp extending to a dispensing end positioned on a side edge of said vehicle, said ramp adapted to support a hay bale thereon;

a ram configured to impart a translation of said hay bale on said ramp, toward said dispensing end;

a cutting blade positioned at or adjacent said dispensing end of said ramp;

said cutting blade actuable to translate through said hay bale in individual cuts of said cutting blade, to thereby separate portions from said hay bale into individual flakes, which sequentially fall to a respective ground position from said dispensing end of said ramp;

a support engaged upon said wheeled vehicle adjacent to said ramp;

said support having a storage position, configured for supporting a secondary said hay bale thereon;

said support having an elevated position wherein a said secondary hay bale positioned thereon, moves to operative positioning upon said ramp; and whereby said secondary hay bale is positionable upon said ramp by a user by actuating said support to move from said storage position to said elevated position.

8. A hay bale flaking apparatus of claim 7, additionally comprising:

said support being rotationally engaged at a first side to said wheeled vehicle;

a support hydraulic cylinder connected to said frame and said support and actuable to move said support to said elevated position; and an input to said controller actuating said support to move to said elevated position, by a third pressurized fluid supply communicating from said controller to said support hydraulic cylinder.

9. A hay bale flaking apparatus, comprising:

a wheeled vehicle having a ramp extending to a dispensing end positioned on a side edge of said vehicle, said ramp adapted to support a hay bale thereon;

a ram configured to impart a translation of said hay bale on said ramp, toward said dispensing end;

a cutting blade positioned at or adjacent said dispensing end of said ramp;

said cutting blade actuable to translate through said hay bale in individual cuts of said cutting blade, to thereby separate portions from said hay bale into individual flakes, which sequentially fall to a respective ground position from said dispensing end of said ramp;

a controller, said controller being user configurable to control a speed of said translation of said hay bale on said ramp and a timing of said individual cuts of said cutting blade, and thereby control a thickness of each said flake and a distance between respective ground positions of each said flake;

a support engaged upon said wheeled vehicle adjacent to said ramp;

said support having a storage position, configured for supporting a secondary said hay bale thereon;

said support having an elevated position wherein a said secondary hay bale positioned thereon, moves to operative positioning upon said ramp; and whereby said secondary hay bale is positionable upon said ramp by a user by actuating said support to move from said storage position to said elevated position.

10. A hay bale flaking apparatus of claim 9, additionally comprising:

said support being rotationally engaged at a first side to said wheeled vehicle;

a support hydraulic cylinder connected to said frame and said support and actuable to move said support to said elevated position; and an input to said controller actuating said support to move to said elevated position, by a third pressurized fluid supply communicating from said controller to said support hydraulic cylinder.

\* \* \* \* \*